Joseph S. Rengert
INVENTOR.

United States Patent Office 3,110,060
Patented Nov. 12, 1963

3,110,060
EXTRUSION-EXTRACTION APPARATUS
Joseph S. Rengert, Rochester, N.Y., assignor to Eastman Kodak Company, Rochester, N.Y., a corporation of New Jersey
Filed Nov. 1, 1962, Ser. No. 234,608
2 Claims. (Cl. 18—12)

This invention relates to an extrusion apparatus, and more particularly to an apparatus for extruding plastics and extracting volatile components from the plastic during the process of extrusion.

In the process of preparing many synthetic plastic materials, such as cellulose acetate and other cellulose esters, acrylic polymers, polystyrene, etc., various volatile components, especially moisture and miscellaneous liquid impurities become incorporated in the plastics. When these plastics are to be extruded, it is desirable to remove volatile components since their presence causes surface imperfections in the resulting extruded plastic. By extraction of such volatile components in the extrusion operation, a separate preliminary drying step can be dispensed with.

One object of my invention is to provide an extrusion apparatus which allows extraction of volatile constituents of plastic being extruded. Another object of my invention is to provide an extrusion screw which increases the distance which a plastic travels in an extruder of a given length.

Figure 1:
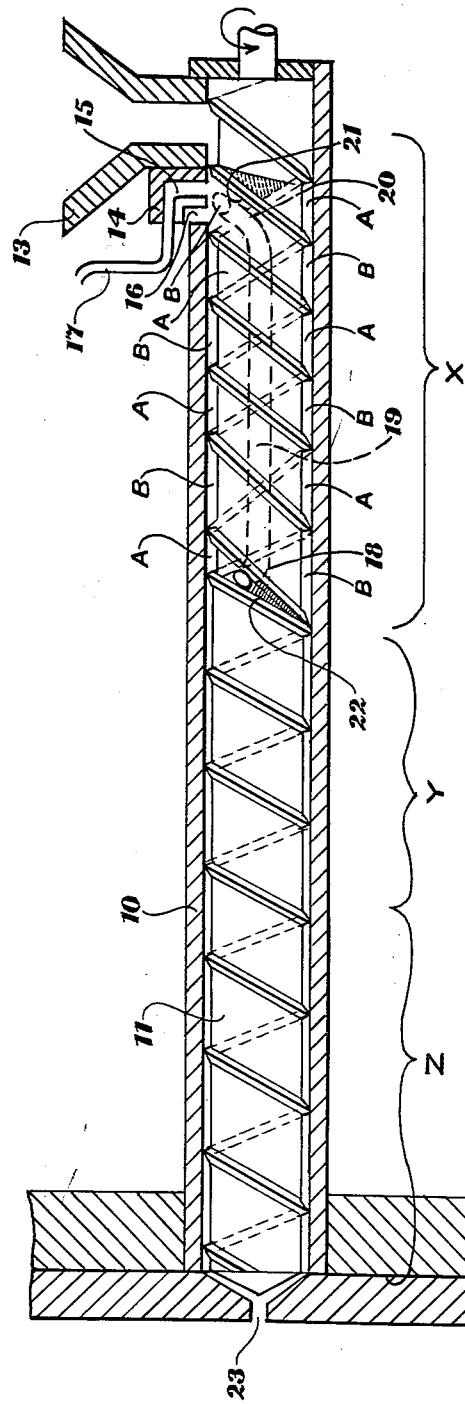
Figure 2:
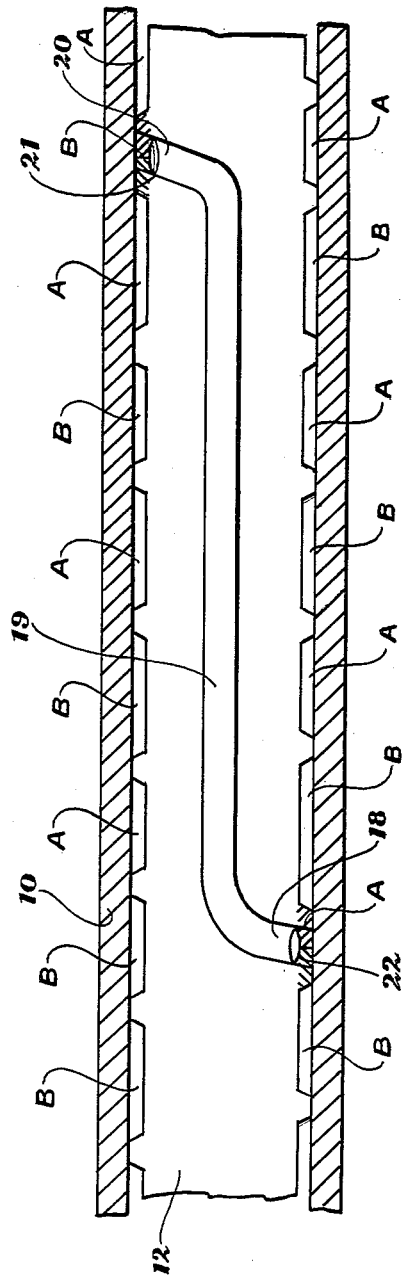

The accompanying drawings show an illustrative embodiment of the extrusion device of the invention. FIG. 1 is a view in section of an extrusion barrel containing feeding and venting means, and housing an extruder screw in accordance with the invention. FIG. 2 is a view in section of the initial portion of the screw extruder showing a hollow core therein connecting two separate flights of the extruder.

FIG. 1 is an extrusion apparatus comprising a cylindrical housing 10 equipped with a feed hopper 13. The cylindrical housing 10 is fitted with a screw device 11, driven by suitable means not shown, which is divided into three zones, designated as X, Y and Z. Zone X, a portion of which is also shown in FIG. 2, is provided with two flights, designated A and B. Flight A communicates with feed hopper 13 and progresses forwardly to the forward part of zone X where it terminates at a passage 18 to a hollow core 19 in the screw 11. The hollow core 19 runs rearwardly from passage 18 to a passage 20 communicating with flight B which commences 21 at the rearward end of zone X and runs to the forward part of zone X where it communicates with a conventional flight which proceeds through zones Y and Z to othe orifice 23 of the extruder.

The housing 10 of the extruder is provided with extracting or venting means 14 which communicates with flight B in the area of the inception of that flight. The venting means 14 is provided with two chambers 15 and 16. Chamber 16 communicates with the atmosphere and chamber 15 communicates with a pipe 17 attached to suitable evacuating means not shown.

In operation, a plastic is fed into feed hopper 13 and is urged forwardly in flight A to the termination thereof at the forward end of zone X wherein sufficient heat is ordinarily generated to melt a thermoplastic material. The plastic now molten, passes through passageway 18 into the hollow core 19 and runs rearwardly therein to passage 20 whereupon the plastic empties into flight B. The molten plastic is then subjected to a current of air effected by vent 14 which draws air from the atmosphere through passageway 15 and out evacuating passage 16 through pipe 17 to the evacuating means. This venting operation effectively extracts volatile impurities from the plastic. Thence, the plastic passes forwardly in flight B to zone Y where it is metered, and zone Z where it is extruded through a suitable shaped orifice 23 in the conventional manner.

Flight A may comprise solely a feeding function, although partial compression of the plastic may be accomplished in this flight. Flight B is designed to compress the plastic, although metering thereof may also be effected in this flight. Zone Y may advantageously be a conventional metering zone and zone Z a standard extruding zone.

Venting preferably is effected at or near the inception of the B flight, which may conveniently be positioned at a point near the commencement of flight A. Any suitable venting means may be employed. Advantageously, the plastic is at about atmospheric pressure in the venting area. This is accomplished, for example, by adjusting the size of hollow core 19 or the size of orifice 20, or by adjusting the root diameter of the screw at the termination of the A flight at the inception of the B flight, depending on the location of the venting means.

The extrusion screw in accordance with this invention effectively removes volatile solvent from the plastic being extruded, and increases the apparent distance a plastic travels in an extruder of given length. In addition, extruder screws in accordance with the invention may be inserted in conventional, nonventing extruders with only minor alterations to provide a vented extruder.

The invention has been described in detail with particular reference to preferred embodiments thereof but it will be understood that variations and modifications can be effected within the spirit and scope of the invention as described hereinabove and as defined in the appended claims.

I claim:
1. A screw-type extrusion apparatus adapted to remove volatile components from thermoplastic material extruded therein comprising a cylindrical barrel, a helical screw conveying device rotatably mounted in said barrel and means for rotating said screw, said screw being provided with a zone containing a first flight of screw threads running the entire length of said zone, said first flight terminating at a first passage in said screw at the forward end of said zone, and a second flight of screw threads commencing at a second passage in said screw rearwardly of said first passage, said second flight running forwardly and communicating with an extrusion orifice, said screw having a hollow core communicating with said first passage and said second passage, and venting means for conducting volatile constituents from said plastic at a point situated along the path of said second flight.

2. In an apparatus for extruding thermoplastic material having a cylindrical barrel, a helical screw conveying device rotatably mounted in said barrel, means for driving said screw and means for feeding the thermoplastic material to the screw, the improvement for removing volatile constituents from the thermoplastic material during the extrusion thereof, comprising, in combination:

(1) a first flight of screw threads communicating with said feeding means and running forwardly along said screw, said first flight terminating at a first passageway in said screw;

(2) a second flight of screw threads commencing rearwardly of the termination of said first flight at a second passageway and communicating with an extrusion orifice;

(3) said screw having a hollow core communicating with said first passageway and said second passageway; and (4) venting means for conducting volatile constituents from said plastic at a point situated along the path of said flight.

References Cited in the file of this patent

UNITED STATES PATENTS

| | | |
|---|---|---|
| 2,343,529 | Brown | Mar. 7, 1944 |
| 2,774,105 | Bernhardt | Dec. 18, 1956 |
| 2,836,851 | Holt | June 3, 1958 |
| 3,029,471 | Adams | Apr. 17, 1962 |